US008578812B2

(12) United States Patent
Minamigata

(10) Patent No.: US 8,578,812 B2
(45) Date of Patent: Nov. 12, 2013

(54) POSITION ADJUSTING DEVICE FOR STEERING WHEEL

(75) Inventor: Takahiro Minamigata, Gunma (JP)

(73) Assignee: NSK, Ltd., Tokyo (JP)

(*) Notice: Subject to any disclaimer, the term of this patent is extended or adjusted under 35 U.S.C. 154(b) by 576 days.

(21) Appl. No.: 12/446,075

(22) PCT Filed: Oct. 16, 2007

(86) PCT No.: PCT/JP2007/070177
§ 371 (c)(1),
(2), (4) Date: Nov. 3, 2010

(87) PCT Pub. No.: WO2008/050639
PCT Pub. Date: May 2, 2008

(65) Prior Publication Data
US 2011/0036198 A1 Feb. 17, 2011

(30) Foreign Application Priority Data
Oct. 19, 2006 (JP) .................. 2006-284463

(51) Int. Cl.
*B62D 1/16* (2006.01)
(52) U.S. Cl.
USPC ............................. 74/492; 74/493; 280/775
(58) Field of Classification Search
USPC ................ 74/491, 492, 493, 531, 494, 495; 280/775, 777
See application file for complete search history.

(56) References Cited

U.S. PATENT DOCUMENTS

| 5,941,129 | A * | 8/1999 | Anspaugh et al. ............ 74/493 |
| 6,092,957 | A * | 7/2000 | Fevre et al. .................. 403/373 |
| 6,282,978 | B1 * | 9/2001 | Kurita ............................ 74/493 |
| 6,343,523 | B1 * | 2/2002 | Castellon ...................... 74/493 |
| 6,623,036 | B2 * | 9/2003 | Yamamura et al. ........... 280/775 |
| 6,688,644 | B2 * | 2/2004 | Tsunoda et al. .............. 280/777 |
| 6,792,824 | B2 * | 9/2004 | Jolley et al. ................... 74/493 |
| 6,860,669 | B2 * | 3/2005 | Laisement et al. ......... 403/109.1 |
| 7,219,926 | B2 * | 5/2007 | Ikeda et al. ................... 280/775 |
| 7,735,391 | B2 * | 6/2010 | Osawa et al. .................. 74/493 |
| 2002/0178857 | A1 * | 12/2002 | Matsumiya .................... 74/493 |
| 2005/0236825 | A1 * | 10/2005 | Sawada et al. ............... 280/775 |
| 2011/0036198 | A1 * | 2/2011 | Minamigata ................... 74/493 |

FOREIGN PATENT DOCUMENTS

| JP | 62-019483 Y2 | 1/1987 |
| JP | 10-035511 A | 2/1998 |
| JP | 2000-025622 A | 1/2000 |

(Continued)

*Primary Examiner* — Justin Krause
*Assistant Examiner* — Alexander Vu
(74) *Attorney, Agent, or Firm* — Miles & Stockbridge P.C.

(57) ABSTRACT

A structure is realized that is capable of preventing interference of respective friction plates (39, 40a, 40b) with other members existing therearound or with the body of a driver, and furthermore that facilitates, when assembling, insertion of a tension rod (17a) through a circular hole (47) and longitudinal elongated holes (18a, 18b) formed in the respective friction plates (39, 40a, 40b). The respective friction plates (39, 40a, 40b) are arranged between both of the side faces of a displacement bracket section (36) and the inner face of supporting plate sections (22a) that constitute a fixed side bracket (15a). Moreover, the end edges of the respective friction plates (39, 40a, 40b) symmetrically present in pairs are connected by connecting sections (45, 46a, 46b), to thereby integrate the left and right friction plates (39, 40a, 40b) so that the respective holes (45, 18a, 18b), through which the tension rod (17a) is to be inserted, can be easily aligned.

5 Claims, 7 Drawing Sheets

(56) References Cited

FOREIGN PATENT DOCUMENTS

| JP | 2001-213331 A | 8/2001 |
| JP | 2001-294162 A | 10/2001 |
| JP | 2002-096742 A | 4/2002 |
| JP | 2003-276614 A | 10/2003 |
| JP | 2004-210264 A | 7/2004 |
| JP | 2006-117120 A | 5/2006 |
| JP | 2006-168492 A | 6/2006 |

* cited by examiner

POSITION ADJUSTING DEVICE FOR STEERING WHEEL

TECHNICAL FIELD

The present invention relates to an improvement in a position adjusting device for a steering wheel that enables adjustment of the height position and longitudinal position of a steering wheel for steering a vehicle.

BACKGROUND ART

Heretofore, a position adjusting device for a steering wheel has been used for changing the height position or longitudinal position of a steering wheel according to the physical attribute of the body of a driver, the driving posture of the driver, and the like. In general, as such a position adjusting device, there has been used a structure in which a frictional force between a fixed side bracket supported and fixed on the vehicle body side and a displacement side bracket set on the steering column side is adjusted. That is to say, when adjusting the position of the steering wheel, an adjusting lever is operated in a predetermined direction to thereby reduce the frictional force acting between both of the above brackets. On the other hand, when holding the position of the steering wheel at a post-adjustment position, the adjusting lever is operated in a direction opposite to the predetermined direction, to thereby increase the frictional force. In the case of such a structure, it is preferable that the friction area is increased in order to increase the force for holding the position of the steering wheel at the post-adjustment position without increasing the operating amount or operating force of the adjusting lever. Taking such circumstances into consideration, Patent Documents 1 and 2 disclose structures in which a plurality of friction members is superposed to thereby increase the friction area.

FIG. 6 and FIG. 7 show an example of such a position adjusting device for a steering wheel wherein a plurality of friction members is used to thereby increase the friction area, so that the force for holding the position of a steering wheel (1) at the post-adjustment position is increased. This structure enables adjustment of the vertical and longitudinal position of the steering wheel (1).

The steering wheel (1) is supported and fixed on the rear end section (upper end section) of a steering shaft (2) provided in a state of being inclined in an upward direction towards the rear side (right side in FIG. 6). This steering shaft (2) is such that the front end section of an outer shaft (3) provided on the rear half section (right half section in FIG. 6) is spline-engaged with the rear end section of an inner shaft (4) provided on the front half section (left half section in FIG. 6), to thereby enable adjustment of the longitudinal position of the outer shaft (3). Such a steering shaft (2) is supported, while only being allowed to rotate, with roller bearings (8a, 8b, 8c) such as deep groove ball bearings (in a state where axial displacement with respect to the steering column (7) is blocked), on the inside of a steering column (7) formed with an outer column (5) and an inner column (6) combined telescopically (extendably and retractably).

Moreover, in the example shown in the drawings, there is installed an electric power steering device that applies an auxiliary steering force to the steering shaft (2) using an electric motor. Therefore an electric motor is fixed in a housing (9) fixed on the front end section of the steering column (7), and there is installed a gear transmission mechanism for transmitting the output of the electric motor to the steering shaft (2). The structure of the electric power steering device has been widely known heretofore and is not a key issue of the present invention (the present invention can be practiced regardless of the presence or structure of the power steering device), and the detailed description thereof is therefore omitted. The housing (9) is, via a cross shaft (10) and oscillating bracket (11), swingably supported on one portion of a vehicle body. Moreover, the portion at the front end section of the steering shaft (2) that projects from the housing (9) is connected to an intermediate shaft (13) via a universal coupling (12). This intermediate shaft (13) is also such that the entire length thereof can be extended and retracted with a spline engagement section provided in an intermediate section thereof, and displacement of the universal coupling (12) in the longitudinal direction due to oscillating of the steering column (7) can be absorbed.

With the above configuration, it is possible to adjust the height position of the steering wheel (1) based on oscillating displacement about the cross shaft (10), and it is possible to adjust the longitudinal position of the steering wheel (1) based on the telescopic motion of the steering shaft (2) and the steering column (7). In order to fix the position of this steering wheel (1) at a post adjustment position, a displacement side bracket (14) is set on a part of the steering column (7) and a fixed side bracket (15) is fixed on the vehicle body side. Both of these brackets (14) and (15) can be freely engaged with or disengaged from each other with operation of a position adjusting lever (16). The front end section of the intermediate shaft (13) is connected, via another universal coupling, to a steering gear input shaft (not shown in the drawing), so that desired angles can be given to wheels to be steered (front wheels in general) based on the rotation of this intermediate shaft (13).

In the example shown in the drawing, the displacement side bracket (14) is provided integrally with the outer column (5) in the front end side portion of the bottom face of this outer column (5) that is an aluminum alloy casting (including a die cast molded product) and that constitutes the steering column (7). Also, in the displacement side bracket (14), there is formed, in a state of passing through the displacement side bracket (14) in the left-right direction (transverse direction), a longitudinal elongated hole (18), which is elongate in the longitudinal direction, for inserting a tension rod (17) as a rod member therethrough.

Moreover, the fixed side bracket (15) is formed such that an upper side bracket element (19) and a lower side bracket element (20) respectively bent-formed with metal plates are join-fixed by means of welding. The upper side bracket element (19) is to support and fix the fixed side bracket (15) on the vehicle body side, and has a pair of left and right attachment plate sections (21). With the structure commonly known in the technical field of a steering wheel device for a vehicle, both of these attachment plate sections (21) are supported and fixed on the vehicle body side while being allowed to come away forward in the case of a secondary collision.

Moreover, the lower side bracket element (20) has a pair of supporting plate sections (22) respectively extending down in the vertical direction from the bottom face of the upper side bracket element (19). A gap D between the inner faces (side faces opposing each other) of both of these supporting plate sections (22) substantially matches a gap W between the outer faces of the displacement side bracket (14) (width of the displacement side bracket (14)) (D≈W). In each position of both of the above supporting plate sections (22) which align with each other, there is formed a vertical elongated hole (23) for inserting the tension rod (17) therethrough (that is preferably of an arc shape about the cross shaft (10)) that is elongate in the vertical direction. On each outer face portion of both of the supporting plate sections (22), there is arranged a plurality of first friction plates (24) and a plurality of second friction plates (25).

Among these first and second friction plates (24, 25), in the first friction plates (24) arranged in the vertical direction along the outer faces of both of these supporting plate sections (22), there is respectively formed a first elongated hole (26) that aligns with the vertical elongated hole (23) formed in both of these supporting plate sections (22). The upper end section of each first friction plate (24) respectively having such a configuration is joined and supported on the upper end section outer face of both of the supporting plate sections (22) with a first set screw (27). Therefore, each first friction plate (24) does not displace in the vertical direction.

On the other hand, in the second friction plates (25) arranged in the longitudinal direction along the displacement side bracket (14), there is respectively formed a second elongated hole (28) that aligns with the longitudinal elongated hole (18) formed in the displacement side bracket (14). The front end section of each second friction plate (25) respectively having such a configuration is joined and supported on the front end section outer face of the displacement side bracket (14) with a second set screw (29). Therefore, each second friction plate (25) does not displace in the longitudinal direction. Each of such second friction plates (25) and each of the first friction plates (24) are arranged on the outer face of both of these supporting plate sections (22) in a state of being alternately superposed.

Moreover, the tension rod (17) is inserted through; the longitudinal elongated hole (18), both of the vertical elongated holes (23), and the respective first and second elongated holes (26, 28). This tension rod (17) has an outward flange shaped flange section (30) formed on the base end section thereof (right end section in FIG. 7), and an engagement section (32) formed on the base end side portion of a rod section (31) is engaged with one of the vertical elongated holes (23) which is on one side (the right side in FIG. 7) while only allowing itself free displacement (elevation) along this vertical elongated hole (23). Consequently, the sectional shape of the engagement section (32) is of a non-circular shape such as oval shape having a straight line portion that comes in sliding contact with the inner edge of the vertical elongated hole (23), but that blocks rotation inside this vertical elongated hole (23).

On the other hand, a pressing plate (33) is externally fitted onto a portion of the tip end side portion of the intermediate section of the rod section (31), which projects from the supporting plate section (22) which is on the other side (the left side in FIG. 7) and the respective first and second friction plates (24, 25) arranged on the outer face portion of this supporting plate section (22), and there is also provided a cam mechanism (34) for the purpose of pressing thereto. This cam mechanism (34) and the tension rod (17) form a pressing device. This cam mechanism (34) is one that has a structure widely known in the technical field of a steering wheel device for a vehicle, and has a structure that allows an axial dimension T to increase and decrease based on the operation of the position adjusting lever (16). In the state where this position adjusting lever (16) has been turned in a predetermined direction and the axial dimension T has been thereby increased, the distance between the one side face of the pressing plate (33) and the inner face of the flange section (30) is reduced to thereby increase a frictional force that is present between both of these faces and that acts between the opposing faces that are friction-engaged with each other.

That is to say, in this state: the contact pressure between both side faces of the displacement side bracket (14) and the inner faces of both of the supporting plate sections (22); the contact pressure between the outer faces of both of these supporting plate sections (22) and the inner face of the innermost second friction plate (25); the contact pressure between the side faces of the respective first and second friction plates (24, 25) adjacent to each other; and the contact pressure between the outer face of the outermost first friction plate (24) and one side face of the pressing plate (33) or the inner face of the flange section (30), all increase. In this state, the total sum of the frictional forces that act between the respective frictional engagement sections becomes sufficiently large. As a result, it is possible to sufficiently increase the supporting strength of the displacement side bracket (14) with respect to the fixed side bracket (15), while maintaining the position of the steering wheel (1) in the same state with a sufficiently large strength.

On the other hand, when adjusting the position of the steering wheel (1), the position adjusting lever (16) is turned in the direction opposite to the above predetermined direction, to thereby reduce the axial dimension T and increase the distance between the one side face of the pressing plate (33) and the inner face of the flange section (30). In this state, the frictional force that is present between both of these faces and that acts between the opposing faces that are friction-engaged with each other is reduced or lost, and it becomes possible to adjust the displacement side bracket (14) with respect to the fixed side bracket (15), in the vertical and longitudinal directions. Accordingly, having adjusted the position of the steering wheel (1) to a desired position in this state, the position adjusting lever (16) is turned in the predetermined direction. As a result, the position of the steering wheel (1) is held at the desired position.

In the case of the structure shown in FIG. 6 and FIG. 7, the respective first and second friction plates (24, 25) are arranged outside of the pair of supporting plate sections (22) that constitute the fixed side bracket (15). Each of the friction plates (24, 25) is respectively of a thin plate shape with a low level of rigidity, and can be easily deformed based on interference (abutment) with other members existing therearound. In the case of being deformed, even in a state where the position adjusting lever (16) has been turned in the predetermined direction, a desired frictional force cannot be generated in the contact portion between the respective friction plates (24, 25), so that the force for maintaining the steering wheel (1) at the desired position may become weaker. Moreover, still there is a possibility of injuries to the driver if part of the body of the driver such as the knee collides with an end edge of any one of the friction plates (24, 25) in the event of a collision accident or the like.

In the case of the conventional structure shown in FIG. 6 and FIG. 7, a plurality of independent flat first and second friction plates (24, 25) are respectively provided for each outer face portion of both of the supporting plate sections (22). That is to say, in the example shown in the drawings, two of each of the friction plates (24, 25) being four in total, are provided for each outer face portion of each supporting plate section (22), meaning a total of eight friction plates are provided therefor. The respective end sections of these friction plates (24, 25) are supported on both of the supporting plate sections (22) (fixed side bracket (15)) or on the displacement side bracket (14) with the first and second set screws (27, 29). However, until the tension rod (17) has been inserted into the first and second elongated holes (26, 28), the respective friction plates (24, 25) can oscillate or turn about the first and second set screws (27, 29).

When assembling the position adjusting device for a steering wheel, the tension rod (17) needs to be inserted not only through the longitudinal and vertical elongated holes (18, 23), but also through the respective first and second elongated holes (26, 28). When carrying out such an insertion operation, these respective first and second elongated holes (26, 28) need to be aligned. However, if the respective friction plates (24, 25) independently oscillate or turn, then such an alignment operation needs to be carried out for the respective friction plates (24, 25), increasing the operational burden. As a result, it becomes an obstacle to assembly operation efficiency of the position adjusting device for a steering wheel, making it more difficult to achieve a cost reduction in this position adjusting device for a steering wheel. Patent Document 2 discloses a structure in which the base end sections of a plurality of friction plates are superposed via spacers, and the base end section of each friction plate and the spacer are fixed by means of welding. However in the case of such a structure disclosed in Patent Document 2, it is necessary to carry out a welding operation in a state where the spacers and the base end sections of the respective friction plates are appropriately superposed, and therefore the operational burden in manufacturing is significant and a cost reduction cannot be easily achieved.

Patent Document 1: Japanese Patent Application Publication No. H10-35511
Patent Document 2: Japanese Utility Model Publication No. S62-19483

DISCLOSURE OF THE INVENTION

Problems to be Solved by the Invention

Taking the above circumstances into consideration, the object of the present invention is to realize a position adjusting device for a steering wheel capable of preventing interference of respective friction plates with other members existing therearound or with the body of a driver, and that facilitates, as necessary when assembling, insertion of a rod member such as a tension rod through a through hole or elongated holes formed in the first and second friction members, and that can increase the efficiency of the assembly operation.

Means for Solving the Problems

A position adjusting device for a steering wheel according to the present invention, as with the aforementioned conventionally known position adjusting device for a steering wheel, is provided with a steering shaft, a steering column, a displacement side bracket, a fixed side bracket, first and second friction members, and a pressing device.

The end section (rear end section or upper end section) of the steering shaft is to be fixed on the steering wheel, and the steering shaft is turned in a desired direction according to operation of this steering wheel.

Moreover, the steering column is provided around the steering shaft to rotatably support this steering shaft.

Also, the displacement side bracket is set on one part of the steering column (integrally provided or joint-fixed as a separate body to the steering column), and is displaced together with the steering column when adjusting the position of the steering wheel.

Moreover, the fixed side bracket has a pair of left and right supporting plate sections provided in a state of sandwiching the displacement side bracket from both left and right sides, and is fixed on the vehicle body side.

Furthermore, the first and second friction members are respectively of a plate shape.

Moreover, the pressing device presses the first and second friction members and both of the supporting plate members against the side face of the displacement side bracket, and it includes a rod member such as tension rod.

The first and second friction members have through holes or elongated holes that are elongate in the direction of steering wheel position adjustment, through which the rod member can be inserted. Among these first and second friction members, at least the friction member having the elongated holes that are elongate in the position adjustment direction, is supported on the fixed side bracket or the displacement side bracket. Furthermore, the first and second friction members, while being alternately superposed, are arranged between the side faces of both of the supporting plate sections and the members that oppose these side faces.

In particular, in the position adjusting device for a steering wheel according to the present invention, the first and second friction members are arranged between the side faces of the displacement side bracket and the inner faces of the supporting plate sections that constitute the fixed side bracket.

Moreover, when implementing the present invention described above, it is preferable that the first and second friction members be arranged between both of the left and right side faces of the displacement side bracket and the inner faces of the pair of supporting plate sections that constitute the fixed side bracket.

Furthermore, when implementing the present invention, it is preferable that the first friction member arranged between the one side face of the displacement side bracket and the inner face of the one supporting plate section that constitutes the fixed side bracket, and the first friction member arranged between the other side face of the displacement side bracket and the inner face of the other supporting plate section that constitutes the fixed side bracket, be connected by a first connecting section, forming a substantially one-side-open rectangular shape, to thereby integrate the first left and right friction members.

Alternatively, it is preferable that the second friction member arranged between the one side face of the displacement side bracket and the inner face of the one supporting plate section that constitutes the fixed side bracket, and the second friction member arranged between the other side face of the displacement side bracket and the inner face of the other supporting plate section that constitutes the fixed side bracket, be connected by a second connecting section, forming a substantially one-side-open rectangular shape, to thereby integrate the second left and right friction members.

Effects of the Invention

In the case of the position adjusting device for a steering wheel according to the present invention configured as described above, the first and second friction members are arranged on the inside of the supporting plate section that constitutes the fixed side bracket, and these respective friction members therefore become covered by this supporting plate section. As a result, it is possible to prevent interference of the respectively thin-plate-shaped first and second friction members, with other members existing therearound or the body of a driver.

Moreover, by increasing the number of the first and second friction members and furthermore the friction area between these respective friction members, and by increasing the force of maintaining the position of the steering wheel in a fixed state, it is possible to effectively prevent inadvertent displacement of the position of the steering wheel.

When implementing such a structure, if the left and right friction members are connected with a connecting section, then an operation of inserting the rod member through these through holes or elongated holes can be easily carried out, and a high level of efficiency in the assembly operation can be achieved.

BRIEF DESCRIPTION OF THE REFERENCE SYMBOLS

Figure 1:
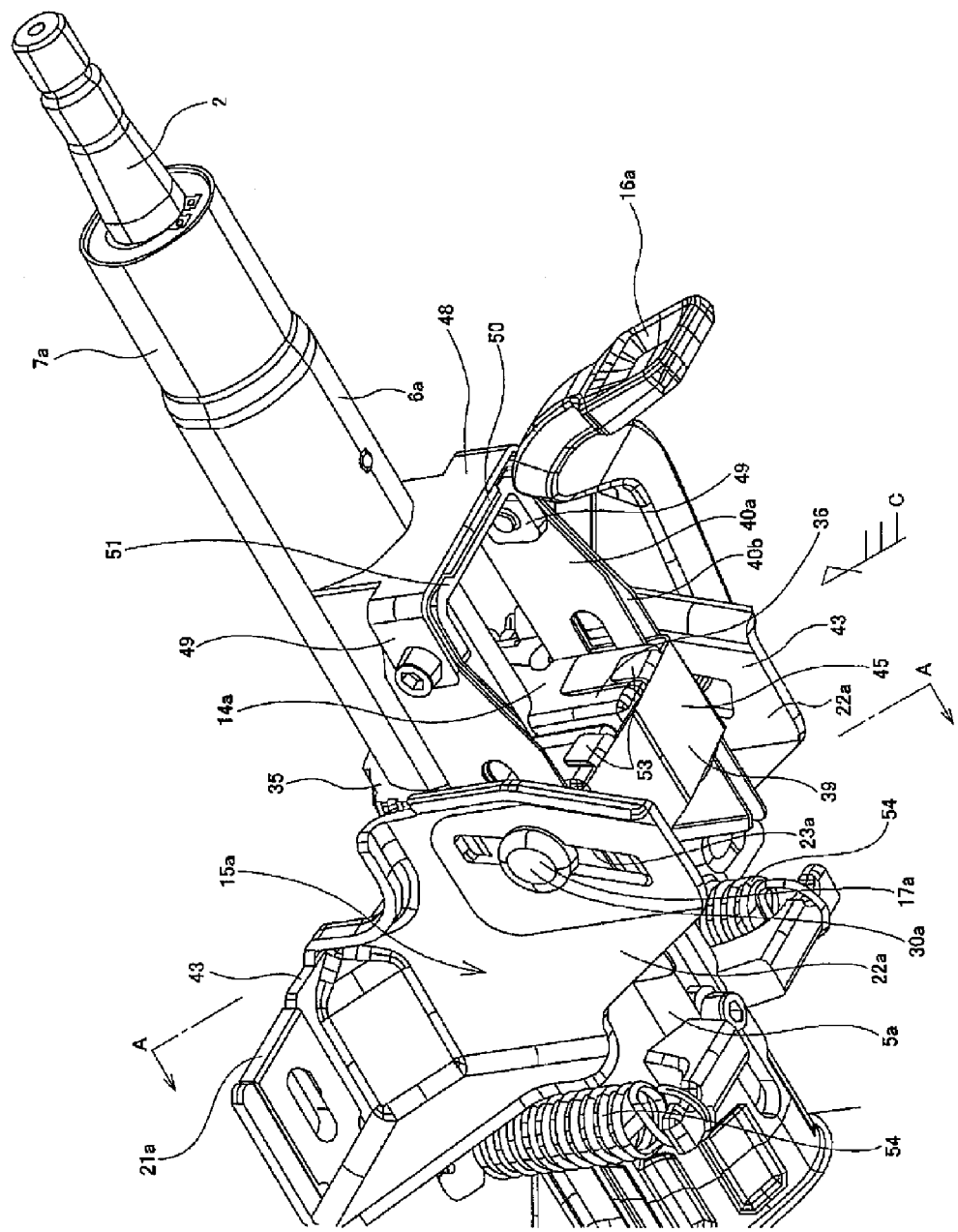
FIG. 1 is a perspective view of main parts, showing an example of an embodiment of the present invention.
Figure 2:
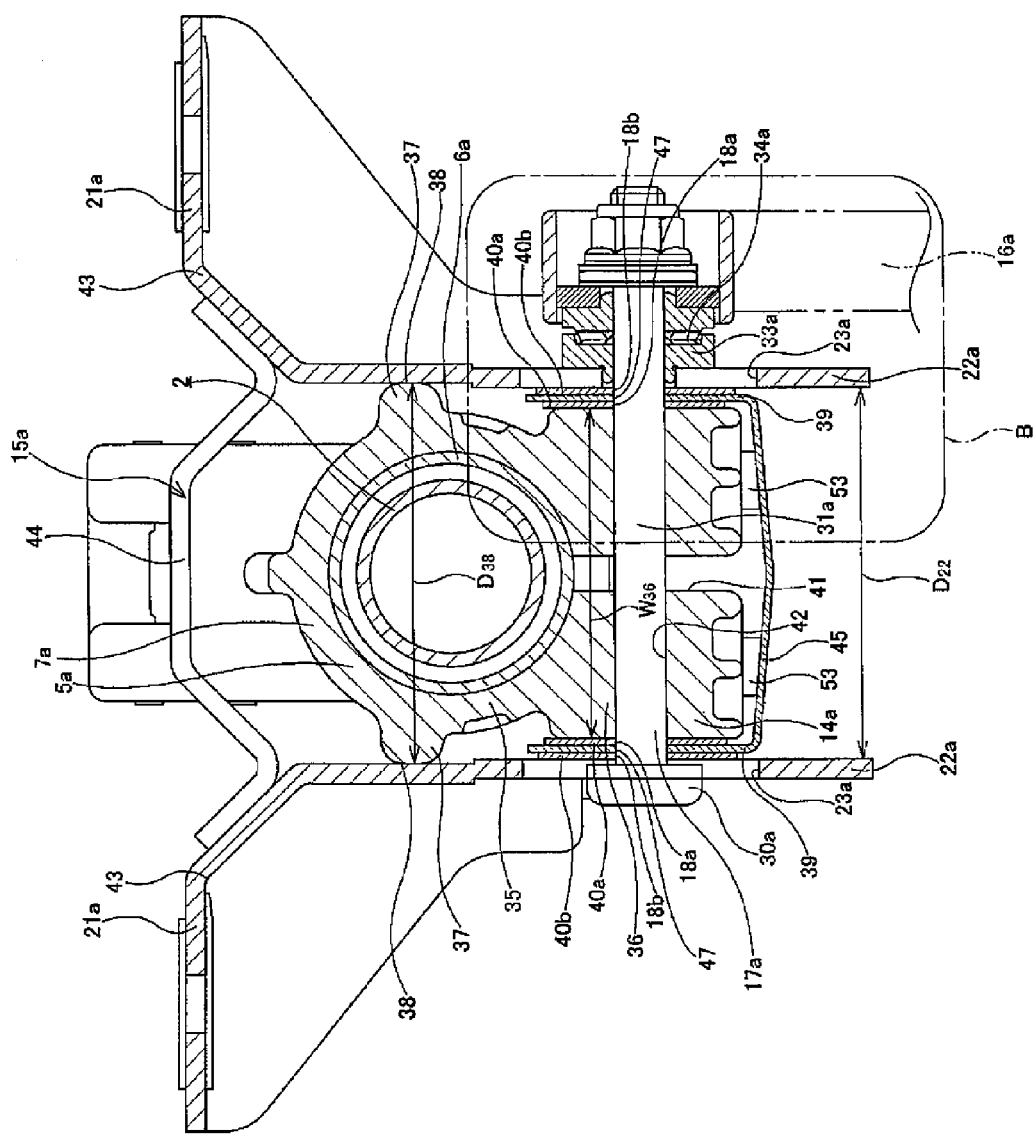
FIG. 2 is a sectional view of FIG. 1 taken along the line A-A.
Figure 3:
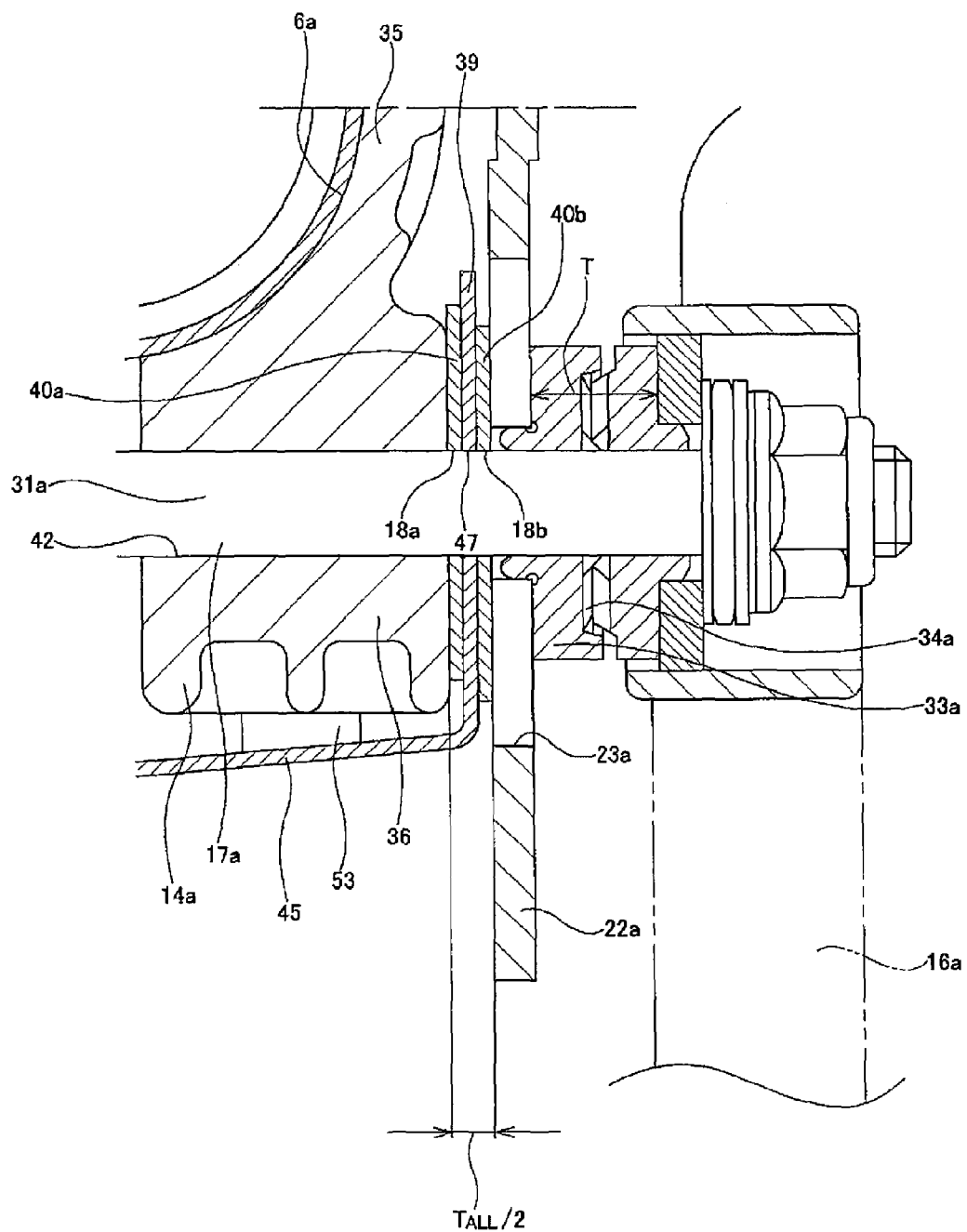
FIG. 3 is an enlarged view of section B of FIG. 2.

1 Steering wheel
2 Steering shaft
3 Outer shaft
4 Inner shaft
5, 5a Outer column
6, 6a Inner column
7, 7a Steering column
8, 8b, 8c Roller bearing
9 Housing
10 Cross shaft
11 Oscillating bracket
12 Universal coupling
13 Intermediate shaft
14, 14a Displacement side bracket
15, 15a Fixed side bracket
16, 16a Position adjusting lever
17, 17a Tension rod
18 Longitudinal elongated hole
19 Upper side bracket element
20 Lower side bracket element
21, 21a Attachment plate section
22, 22a Supporting plate section
23, 23a Vertical elongated hole
24 First friction plate
25 Second friction plate
26 First elongated hole
27 First set screw
28 Second elongated hole
29 Second set screw
30, 30a Flange section
31, 31a Rod section
32 Engaging section
33, 33a Pressing plate
34, 34a Cam mechanism
35 Cylinder section
36 Displacement side bracket section
37 Protruding section
38 Tip end face
39 First friction plate
40a, 40b Second friction plate
41 Slit section
42 Through hole
43 Bracket element
44 Connection element
45 Connecting section
46a, 46b Connecting section
47 Circular hole
48 Connection supporting bracket
49 Bent plate section
50 Supporting plate section
51 Pressing bracket
52 Pressing screw
53 Bent-raised piece
54 Tension spring

BEST MODE FOR CARRYING OUT THE INVENTION

Figure 6:
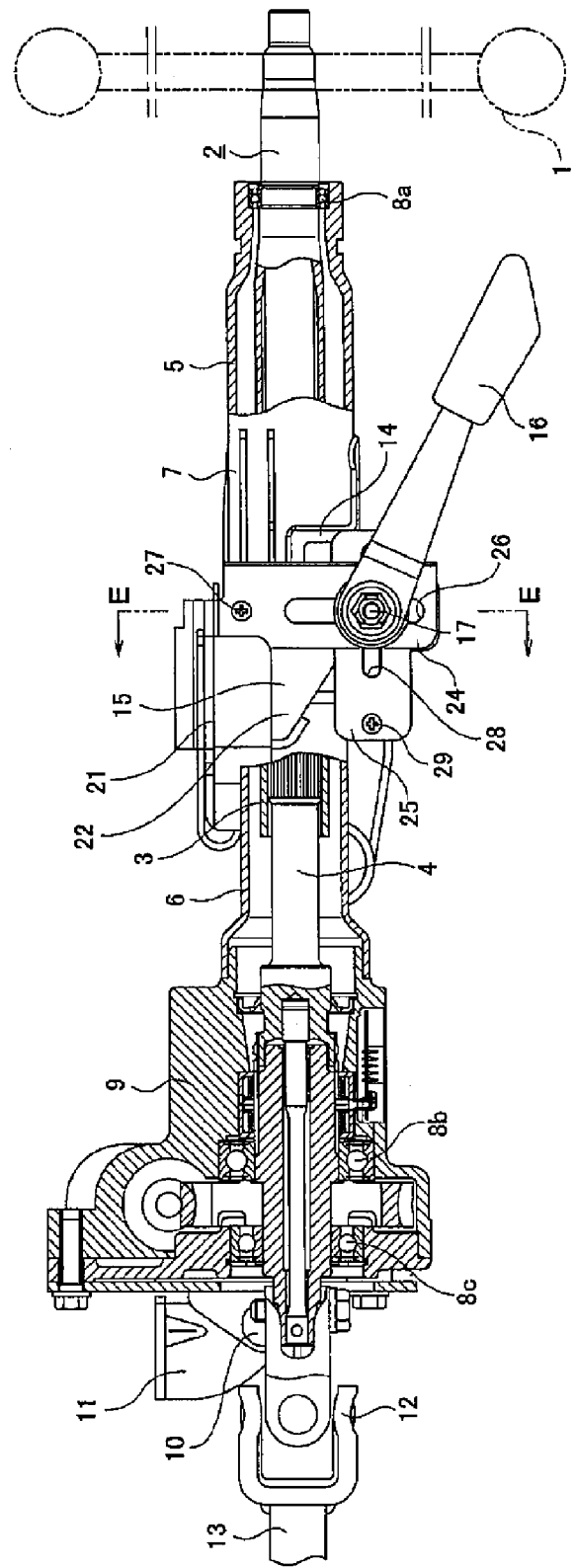
FIG. 6 is a partial sectional side view showing an example of a conventional structure.
Figure 7:
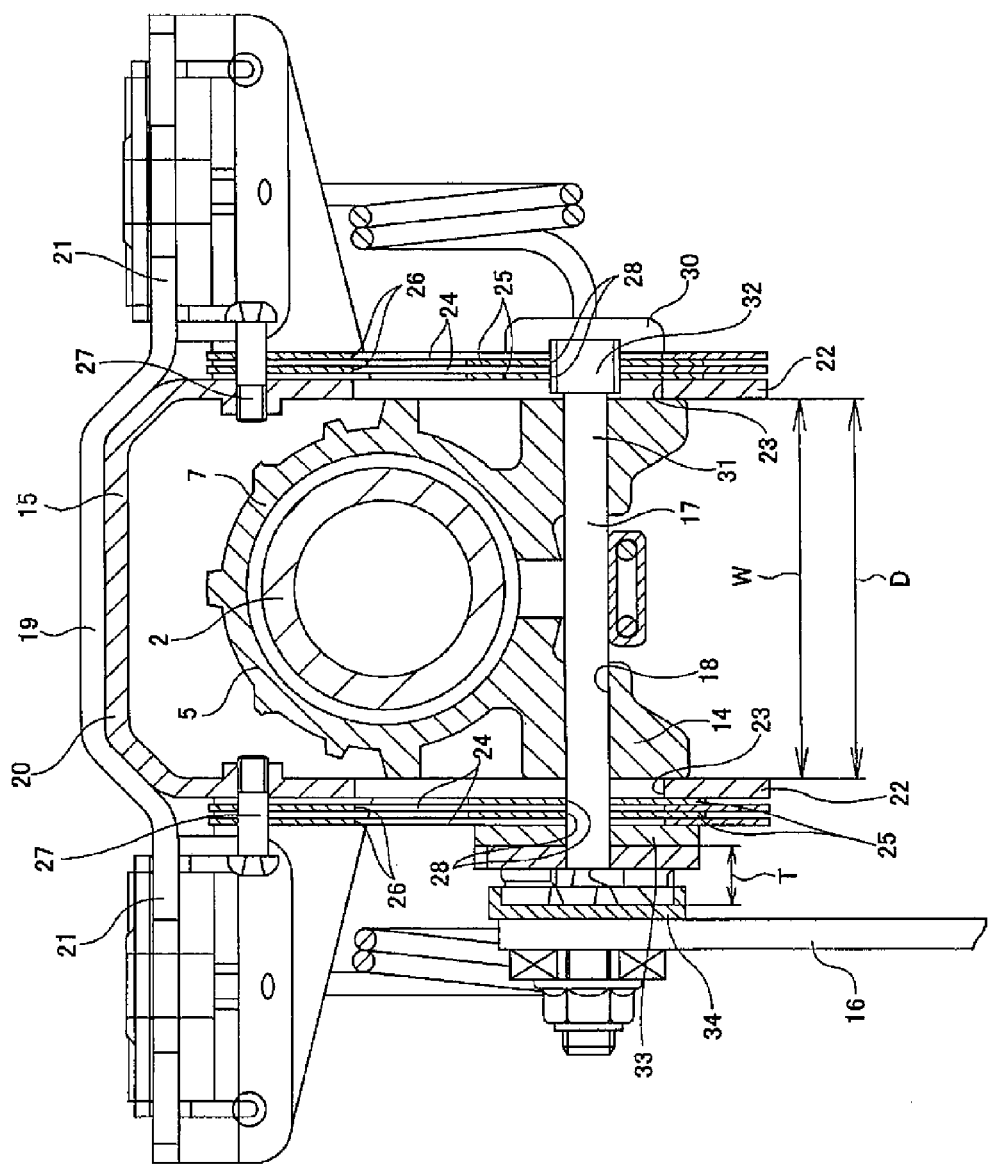
FIG. 7 is a sectional view of FIG. 6 taken along the line E-E.

FIG. 1 to FIG. 5 show an example of an embodiment of the present invention. The front end section of a steering column (7a) that rotatably supports a steering shaft (2) inserted thereinside, is supported while being able to oscillate about a cross shaft (10) provided on an oscillating bracket (11) (refer to FIG. 6). With this configuration, it is possible, at the rear end section of the steering shaft (2), to adjust the height position of a steering wheel (1) (refer to FIG. 6) fixed on a portion protruding towards the rear side of the steering column (7a). Moreover, the steering shaft (2) and the steering column (7a), as with the conventional structure shown in FIG. 6, are capable of extension and retraction. With this configuration, it is possible to adjust the longitudinal position of the steering wheel (1).

In order to hold the vertical position and longitudinal position of this steering wheel (1) in a post adjustment position, a displacement side bracket (14a) is set on part of the steering column (7a) and a fixed side bracket (15a) is set on the vehicle body side. Both of these brackets (14a) and (15a) can be freely engaged with and disengaged from each other with operation of a position adjusting lever (16a). The displacement side bracket (14a) is a casting made of light metal such as aluminum alloy and magnesium alloy, and is integrally formed with an outer column (5a) that constitutes the steering column (7a). As opposed to the conventional structure shown in FIG. 6, the outer column (5a) is arranged on the front side and an inner column (6a) is arranged on the rear side, to thereby configure the steering column (7a) capable of extension and retraction. An upper half section of the displacement side bracket (14a) is a cylinder section (35) for internally fitting the front end section of the inner column (6a) while allowing it to displace in the axial direction, and the lower half section is a displacement side bracket section (36). This displacement side bracket section (36) functions as the displacement side bracket (14a). As the inner column (6a), a cylinder-shaped product formed from a steel sheet, or a casting made of light metal such as aluminum alloy and magnesium alloy, may be employed.

In the case of the present example, on both side faces of the cylinder section (35) there is respectively formed a protruding section (37) that protrudes in the transverse direction. Tip end faces (38) of these protruding sections (37) are flat faces parallel with each other. A distance $D_{38}$ between these flat faces (38) is greater than a width $W_{36}$ of the displacement side bracket section (36) by a dimension substantially equivalent to a total thickness $T_{ALL}$ (refer to FIG. 3) of first and second friction plates (39, 40a, 40b) ($D_{38} \approx W_{36} + T_{ALL}$). Moreover, the displacement side bracket section (36) is divided into two by a slit section (41) present in the transverse direction center section thereof, so that in a case where a significant force in the compression direction acts in the transverse direction, the width of the displacement side bracket section (36) can be elastically reduced while slightly reducing the inner diameter of the outer column (5a). Also, in the displacement side bracket section (36), there is formed, in a state of passing through the displacement side bracket section (36) in the left-right direction (transverse direction), a through hole (42) for inserting a tension rod (17a) as a rod member therethrough.

The fixed side bracket (15a) is formed such that a pair of left and right bracket elements (43) respectively formed from bent metal plates, are connected to each other with a connection element (44), both end sections of which are fixed to both of these bracket elements (43) by means of welding. Both of these bracket elements (43), on each top end section thereof, has an attachment plate section (21a) for supporting and fixing the fixed side bracket (15a) on the vehicle body. With the structure commonly known in the technical field of a steering wheel device for a vehicle, both of these attachment plate sections (21a) are supported and fixed on the vehicle body side while being allowed to come away forward in the case of a secondary collision.

On both of the bracket elements (43), there is provided a pair of supporting plate sections (22a) respectively extending down in the vertical direction from the inner end edge of the attachment plate section (21a). A distance $D_{22}$ between the inner faces (side faces opposing each other) of both of these supporting plates (22a) is substantially equivalent to the distance $D_{38}$ between both of the flat faces (38), and is substantially equivalent to the sum of the width $W_{36}$ of the displacement side bracket section (36) and the total thickness $T_{ALL}$ of the first and second friction plates (39, 40a, 40b) ($D_{38} \approx W_{36} + T_{ALL} \approx D_{22}$). In respective positions of both of the above supporting plate sections (22a) which align with each other, there is formed a vertical elongated hole (23a) for inserting the tension rod (17) therethrough that is of an arc shape about the cross shaft (10) and that is elongate in the vertical direction.

In each gap portion between the inner faces (side faces opposing each other) of both of the supporting plate sections (22a) and the displacement side bracket section (36), there are installed the first and second friction plates (39, 40a, 40b), which are first and second friction members. In the case of the example shown in the drawing, for each of the two gap portions, there are installed one first friction plate (39) and two second friction plates (40a, 40b), that is, three of the friction plates (39, 40a, 40b) in total. That is to say, these friction plates are installed in each of the two gap portions such that two of the second friction plates (40a, 40b) sandwich one of the first friction plate (39) (the friction plates are tightly held between the inner faces of both of the supporting plate sections (22a) and the displacement side bracket section (36)).

Moreover among the set of three friction plates (39, 40a, 40b) installed in each of the two gap portions, the friction plates that are present in positions symmetric to each other about the transverse direction of the displacement side bracket section (36) are connected and integrated by the connection section. First, the bottom end edges of the first friction plates (39) respectively arranged in the intermediate position of each of the gap portions are connected by a connecting section (45) arranged on the lower side of the displacement side bracket section (36) so as to integrate the pair of the left and right first friction plates (39). This connecting section (45) is of an elbow shape with the transverse direction center section of the displacement side bracket section (36) bent downward, so that it can easily deform (the distance between both of these first friction plates (39) can be easily reduced) when the distance between the first friction plates (39) becomes narrower. In the example shown in the drawing, in two positions on both front and rear end edges of the connecting section (45), that is to say, in four positions in total, there are formed bent-raised pieces (53) that are respectively bent upward. The upper end edge or upper side face of each bent-raised piece (53) is in contact with or closely opposes to the bottom face or both front and rear faces of the displacement side bracket section (36), preventing rotation of both of the first friction plates (39) about the tension rod (17a). Moreover, for each of the gap portions, the rear end edges of the second friction plates (40a) arranged closest from the displacement side bracket section (36) side are connected with a connecting section (46a), thereby integrating the pair of left and right second friction plates (40a). Furthermore, for each of the gap portions, the rear end edges of the second friction plates (40b) arranged closest to the both supporting plate sections (22a) side are connected with a connecting section (46b), thereby integrating the pair of left and right second friction plates (40b).

Among such first and second friction plates (39, 40a, 40b) described above, in the center section of the first friction plate (39), there is formed a circular hole (47) for inserting the tension rod (17a) therethrough with substantially no gap therebetween. When assembling the position adjusting device for a steering wheel, the tension rod (17a) is inserted through both of these circular holes (47), and the first friction plates (39) are installed in predetermined positions (while being able to be displaced in the vertical and longitudinal directions together with the displacement side bracket section (36)).

On the other hand, in respective positions of both of the second friction plates (40a, 40b) which align with each other, there are formed longitudinal elongated holes (18a, 18b) respectively elongate in the longitudinal direction through which the tension rod (17a) can be inserted. When assembling the position adjusting device for a steering wheel, the tension rod (17a) is inserted through each of these longitudinal elongated holes (18a, 18b).

Moreover, the respective second friction plates (40a, 40b) are configured such that each of the rear end sections thereof is supported on an intermediate section bottom face of the inner column (6a), and the second friction plates (40a, 40b) move together with this inner column (6a) in the longitudinal direction. Consequently, in the case of the present example, on the intermediate section bottom face of this inner column (6a), there is welded and fixed a connection supporting bracket (48). On both of the left and right lower half end sections of this connection supporting bracket (48), there is formed a pair of bent plate sections (49) bent forward at a right angle, and on the bottom end edge there is formed a supporting plate section (50) bent forward. When supporting the rear end sections of the second friction plates (40a, 40b) on the bottom face of the intermediate section of the inner column (6a), the bottom end edges of the connecting sections (46a, 46b) are placed on the top face of the supporting plate section (50) while the connecting sections (46a, 46b) that connect the rear end edges of these respective second friction plates (40a, 40b) are superposed. In this state, a pressing bracket (51) is pushed in on the inside of the rear end section of the respective second friction plates (40a, 40b), and this pressing bracket (51) is fixed to the connection supporting bracket (48) with pressing screws (52) inserted through both of the bent plate sections (49).

Figure 4:
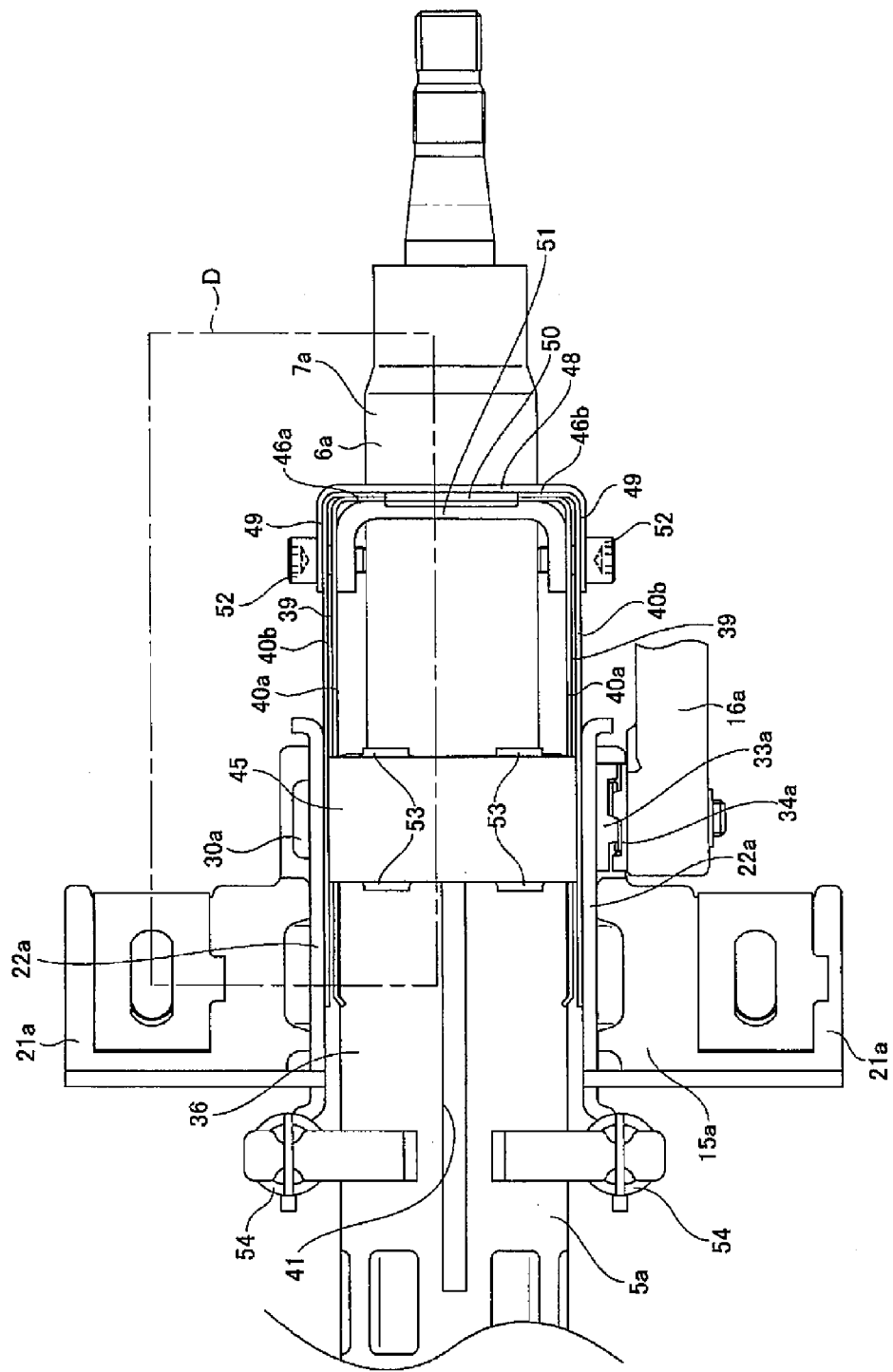
FIG. 4 is a view on arrow C of FIG. 1.
Figure 5:
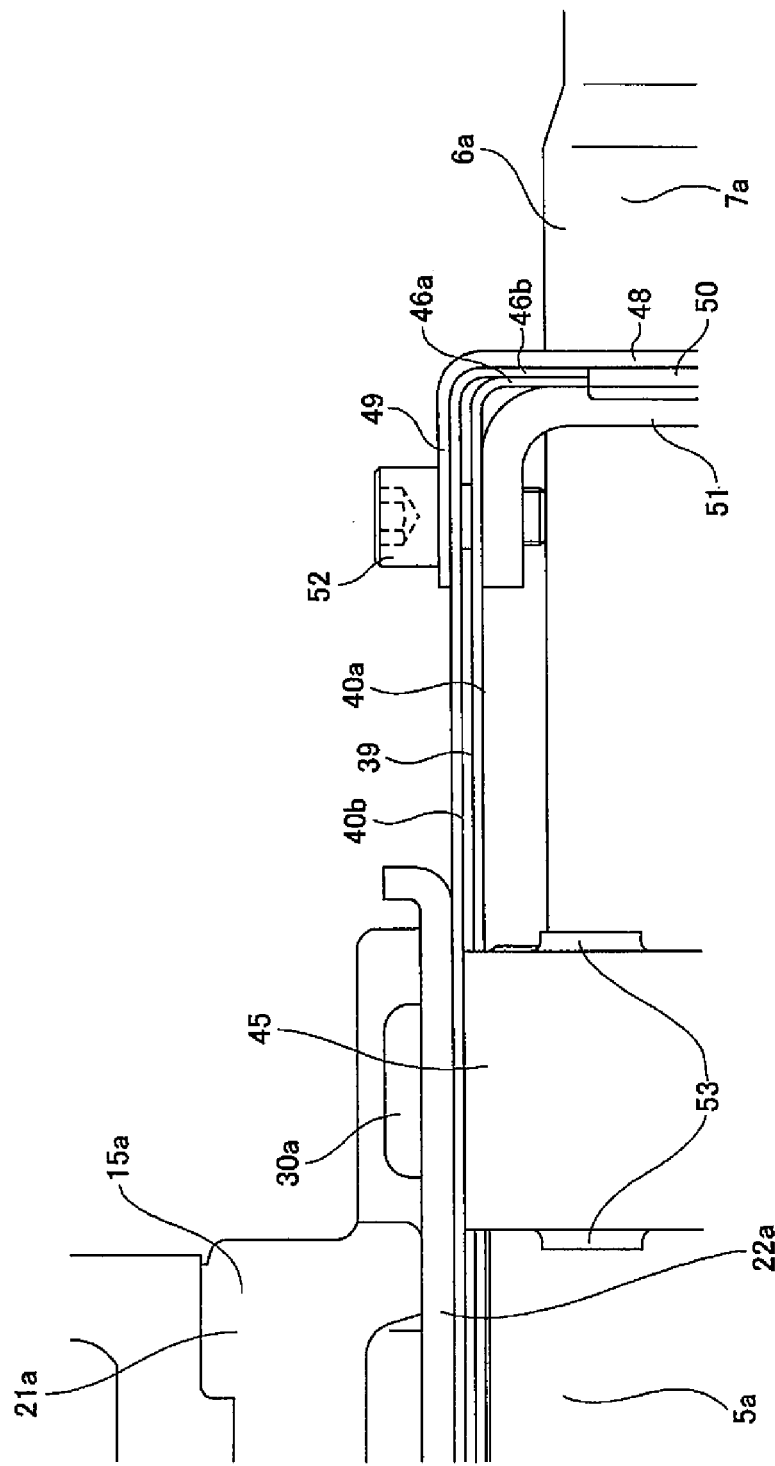
FIG. 5 is an enlarged view of section D of FIG. 4.

In this state, the respective second friction plates (40a, 40b) are such that each of the rear end sections thereof is supported on the intermediate section bottom face of the inner column (6a), and move together with this inner column (6a) in the longitudinal direction. In a state where the rear end sections of the respective second friction plates (40a, 40b) are supported on the intermediate section bottom face of the inner column (6a) in this way, between these respective friction plates (40a, 40b), there are present sufficient gaps for respectively inserting both of the first friction plates (39). As shown in FIG. 4, the front end section of the second friction plate (40a) on the displacement side bracket section (36) side is inclined in a direction of away from the second friction plate (40b) towards the front end edge, so that both of the first friction plates (39) can be easily inserted into the above mentioned gaps.

The tension rod (17a) is inserted through: the longitudinal elongated holes (18a, 18b) formed in the respective second friction plates (40a, 40b) whose rear end sections are respectively connected and supported on the inner column (6a); the circular holes (47) formed in the first friction plates (39); and the vertical elongated holes (23a) formed in both of the supporting plate sections (22a). Regarding this tension rod (17a), an outwardly flanged flange section (30a) is formed on the base end thereof (left end section in FIG. 2). An inner half section of this flange section (30a) engages with one (on the left in FIG. 2) of the vertical elongated holes (23a), while being capable of free movement up and down. Consequently, the sectional shape of the inner half section of the flange section (30a) is of a non-circular shape such as an oval shape having a straight line portion that comes in sliding contact with the inner edge of the vertical elongated hole (23a), but that blocks rotation inside the vertical elongated hole (23a).

On the other hand, on the tip end side portion of an intermediate section of a rod section (31a) that constitutes the tension rod (17a), at the portion that projects from the outer face of the other supporting plate section (22a) (on the right in FIG. 2), a pressing plate (33a) is externally fitted, and together with this a cam mechanism (34a) is provided, thereby constructing a pressing device. The structure and effect of this cam mechanism (34a) is the same as that has a structure widely known in the technical field of a steering wheel device for a vehicle, and has a structure that allows the axial dimension T (refer to FIG. 3) to increase and decrease based on the operation of the position adjusting lever (16a). In the state where this position adjusting lever (16a) has been turned in a predetermined direction, and the axial dimension T has been thereby extended, the gap between the one side face of the pressing plate (33a) and the inner face of the flange section (30a) is reduced to thereby increase a frictional force that is present between both of these faces and that acts between the opposing faces that are friction-engaged with each other.

That is to say, in this state: the contact pressure between both sides faces of the displacement side bracket section (36) and the inner faces of the pair of second friction plates (40a); the contact pressure between the outer faces of both of these second friction plates (40a) and the inner faces of both of the first friction plates (39); the contact pressure between both of these first friction plates (39) and the inner faces of both of the second friction plates (40b); and the contact pressure between the outer faces of both of these second friction plates (40b) and the inner face of both of the supporting plate sections (22a, 22a), all increase. In this state, the total sum of the frictional forces that act between the respective frictional engagement sections becomes sufficiently large. As a result, it is possible to sufficiently increase the supporting strength of the displacement side bracket section (36) with respect to the fixed side bracket (15a), while maintaining the position of the steering wheel (1) in the same state with a sufficiently large strength.

Furthermore, in the case of the present example, in the state where the distance between the one side face of the pressing plate (33a) and the inner face of the flange section (30a) is reduced and the transverse dimension of the displacement side bracket section (36) is reduced, the inner diameter of the cylinder section (35) is reduced, and the frictional force that acts between the inner circumferential face of this cylinder section (35) and the outer circumferential face of the inner column (6a), increases. As a result, the strength of holding the longitudinal position of the steering wheel (1) further increases more than the increase in the contact pressure between the respective faces related to the respective friction plates (39, 40a, 40b). Moreover, the tip end faces (38) of the protruding sections (37) formed on both side faces of the displacement side bracket section (36) come into hard contact with the inner faces of both of the supporting plate sections (22a), serving to resist changes in the vertical position of the displacement side bracket section (36). As a result, the strength of holding the vertical position of the steering wheel (1) also further increases.

On the other hand, when adjusting the position of the steering wheel (1), the position adjusting lever (16a) is turned in the direction opposite to the above predetermined direction, to thereby reduce the axial dimension T and increase the distance between the one side face of the pressing plate (33a) and the inner face of the flange section (30a). In this state, the frictional force that is present between both of these faces and that acts between the opposing faces that are friction-engaged with each other is reduced or lost, and it becomes possible to adjust the displacement side bracket section (36) with respect to the fixed side bracket (15a), in the vertical and longitudinal directions. In the case of the present example, between the top end sections of the pair of bracket elements (43) that constitute the fixed side bracket (15a), and a pair of engaging sections fixed on the bottom face section of the displacement side bracket section (36), there are provided tension springs (54), to thereby support the weight of the portion that elevates together with the displacement side bracket section (36). Therefore, when adjusting the position in the vertical and longitudinal directions, the driver does not need to support the weight of this portion with their hands, allowing an easy operation for this position adjustment. Accordingly, having adjusted the position of the steering wheel (1) to a desired position in this state, the position adjusting lever (16a) is turned in the predetermined direction. As a result, the position of the steering wheel (1) is maintained at the desired position.

In the case of the steering wheel position adjusting device of the present example that is configured and operates as described above, the first and second friction plates (39, 40a, 40b) are arranged inside both of the supporting plate sections (22a) that constitute the fixed side bracket (15a), and consequently the first and second friction plates (39, 40a, 40b) become covered by both of these supporting plate sections (22a). As a result, it is possible to prevent interference of the respective thin-plate-shaped first and second friction plates (39, 40a, 40b), with other members existing therearound, or the body of the driver.

Moreover, in the case of the structure of the present example, when assembling the steering wheel position adjusting device, it is possible to easily carry out the operation of inserting the tension rod (17a) through the circular holes (47) and the longitudinal elongated holes (18a, 18b) respectively formed in the first and second friction plates (39, 40a, 40b), and through the vertical elongated holes (23a) formed in both of the supporting plate sections (22a). That is to say, the second friction plates (40a, 40b) having the respective longitudinal elongated holes (18a, 18b) formed therein are pressed against the connection supporting bracket (48) by the pressing bracket (51), in a state with the respective rear end sections thereof connected by the connecting sections (46a, 46b). Therefore, the respective longitudinal elongated holes (18a, 18b) are substantially pre-aligned prior to insertion of the tension rod (17a) thereinto. Moreover, since the bottom end edges of both of the first friction plates (39) are connected by the connecting section (45), the circular holes (47) formed in both of these first friction plates (39) are also aligned with each other. Consequently, it is possible to align the respective holes (47, 18a, 18b, 23a), and to easily carry out insertion of the tension rod (17a) into these respective holes (47, 18a, 18b, 23a), while achieving a highly efficient assembly operation.

INDUSTRIAL APPLICABILITY

The present invention is to provide a position adjusting device in which the arrangement of the constituent members of the steering wheel position adjusting device is devised to thereby have a structure in which the component members are unlikely to interfere with components therearound, and a high level of installation freedom is achieved.

The invention claimed is:

1. A position adjusting device for a steering wheel comprising:
- a steering shaft that fixes a steering wheel to an end section thereof;
- a steering column that is provided around the steering shaft and that rotatably supports the steering shaft thereon;
- a displacement side bracket set on one part of the steering column;
- a fixed side bracket that has a pair of left and right supporting plate sections provided in a state of sandwiching the displacement side bracket from both left and right sides and that is fixed on a vehicle body side;
- first and second friction members being plate-shaped respectively; and
- a pressing device that includes a rod member and that clamps the first and second friction members, the supporting plate sections, and the displacement side bracket;
- the first and second friction members each having a through hole or an elongated hole that is elongate in a direction of position adjustment of the steering wheel, through which the rod member can be inserted;
- at least one friction member having the elongated hole that is elongate in the direction of position adjustment, among the first and second friction members, being supported on the fixed side bracket or the displacement side bracket; and
- the first and second friction members being arranged, in a state of being alternately superposed;
- wherein the first and second friction members are arranged between a side face of the displacement side bracket and an inner face of one of the supporting plate sections of the fixed side bracket that faces the side face of the displacement side bracket,
- wherein respective sets of the first and second friction members are arranged between both of the left and right side faces of the displacement side bracket and the inner faces of the pair of supporting plate sections of the fixed side bracket,
- wherein first friction members of the respective sets are connected by a first connecting section, forming a substantially three-sided rectangular shape open at one side thereof, to thereby integrate the first friction members on both sides of the steering column, and
- wherein second friction members of the respective sets are connected by a second connecting section, forming a substantially three-sided rectangular shape open at one side thereof, to thereby integrate the second friction members on both sides of the steering column.

2. A position adjusting device for a steering wheel according to claim 1, wherein the first connecting section is arranged in the lower side of the displacement bracket, and the second connecting section connects rear end edges of the second friction plates.

3. A position adjusting device for a steering wheel according to claim 2, wherein the pair of left and right supporting plate sections each have a vertical elongated hole for inserting the rod member that is elongate in the vertical direction, the first friction members each have the through hole, the second friction members each have the elongated hole that is elongate in the longitudinal direction, and the rod member is inserted through the longitudinal elongated holes, the through holes and the vertical elongated holes.

4. A position adjusting device for a steering wheel according to claim 3, wherein the steering column comprises a column that is arranged on the front side and a column that is arranged on the rear side such that the steering column is capable of extension and retraction, and the respective second friction members are such that each of the rear end sections thereof is supported on the inner column and move together with the inner column.

5. A position adjusting device for a steering wheel according to claim 4, wherein each of the first friction members comprises one first friction plate, each of the second friction members comprises two second friction plates, and these first and second friction plates are installed such that the second friction plates sandwich the first friction member between the supporting plate sections and the displacement side bracket.

* * * * *